United States Patent

Maruyama

Patent Number: 5,822,076
Date of Patent: *Oct. 13, 1998

[54] FACSIMILE APPARATUS WITH INK CARTRIDGE AND RESIDUAL INK DETECTION FUNCTION

[75] Inventor: Kenichi Maruyama, Narashino, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 724,311

[22] Filed: Oct. 1, 1996

[30] Foreign Application Priority Data

Oct. 2, 1995 [JP] Japan ................... 7-255297

[51] Int. Cl.⁶ ............ H04N 1/32; H04N 1/16; H04N 1/034; H04N 29/393
[52] U.S. Cl. .................. 358/296; 358/434; 358/502; 347/3; 347/9; 347/86
[58] Field of Search .................. 358/296, 401, 358/404, 406, 434, 441, 444, 468, 502; 347/3, 5, 6, 13, 14, 19, 40, 42, 43, 47, 86, 87

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,349,450 | 9/1994 | Yoshioka et al. ........... 358/502 X |
| 5,504,512 | 4/1996 | Shimoda et al. ........... 347/86 |
| 5,512,925 | 4/1996 | Ohashi ........... 347/86 |
| 5,657,057 | 8/1997 | Nakajima et al. ........... 347/14 X |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A facsimile apparatus which prints a received image using ink, and which can perform residual-ink detection and verification of detection result with simple construction. The apparatus judges whether or not the ink is exhausted, based on a detected pulse width from a photosensor for determining existence/absence of the ink. If the result of the residual-ink detection is not reliable, the apparatus examines again the detected pulse from the photosensor when actual ink discharge operation is not performed. If the result of the re-examination is different from an expected result, the apparatus notifies a message indicating an occurrence of abnormality on an LCD.

36 Claims, 5 Drawing Sheets

FACSIMILE APPARATUS WITH INK CARTRIDGE AND RESIDUAL INK DETECTION FUNCTION

BACKGROUND OF THE INVENTION

This invention relates to a facsimile apparatus and, more particularly to a facsimile apparatus having a printer which performs printing in accordance with an ink-jet printing method.

Conventionally, a printer which uses a printhead, comprising a plurality of nozzles, to print an image on a print medium by discharging ink droplets from the nozzles, is known as an ink-jet printer. Recently, a facsimile apparatus employing this ink-jet printer as a printing unit has been proposed.

However, in the above-mentioned ink-jet printer, if the amount of residual ink is small upon image printing, a printed image may have an unprinted area due to failure of ink discharge on a print medium or an image area of degraded image quality due to abnormality in printing, thus normal image printing cannot be performed. In this case, the printed image lacks image quality worthy of a document. Since such printing has no value, print medium is wasted.

In development and improvement of ink-jet printer, various residual-ink detection methods have been considered, taking the above drawback into consideration. Known examples are, (1) detecting existence/absence of ink within an ink container (ink tank) by ① detecting electric conductivity between a pair of electrodes provided in the container; ② detecting transmittance of irradiated light or quantity of reflection light; (2) detecting change of weight of the ink tank; (3) printing a test pattern on a print medium, and detecting the condition of the printed test-pattern image, to judge whether or not ink discharge has been normally performed; and (4) detecting discharge/undischarge of ink.

When image printing cannot be normally performed as described above, ink-discharge failure may be caused by, not only decreased residual ink or ink exhaustion, but discharge orifices clogged with ink having increased viscosity as it dries. As the latter case may occur even when the amount of residual ink is large, the above methods of detecting ink within an ink container by using electrodes or an optical sensor can hardly detect this phenomenon. On the other hand, the method of detecting the condition of printed image or detecting discharged ink droplets can detect the ink-discharge failure.

In a facsimile apparatus, facsimile image printing is instructed via a telephone line, and image data to be print-outputted is also transmitted via the telephone line. Generally, the facsimile apparatus does not store all the received image data, but when printing for some area has been completed, deletes image data corresponding to the printed area from a memory. This reduces the requirement for memory capacity and reduces costs of the apparatus.

As described above, in the facsimile apparatus using the ink-jet printer as its printer unit, image printing may not be normally performed regardless of residual ink amount. In such case, if it is judged that ink remains, an image of degraded image quality is printed. On the other hand, as received data used in printing is deleted from a memory, to re-print based on the deleted data, it is necessary to request a transmitting side to re-transmit the data, which increases a user's labor. Accordingly, in the facsimile apparatus, it is desirable to employ the method of detecting the condition of printed image and/or the method of detecting ink-discharge status, which enables to detect not only decreased residual ink amount but degradation of ink discharge due to clogged nozzles.

As an example of detecting ink-discharge status, a method of discharging ink droplets so as to interrupt an optical axis of light of a photo-interruptive type sensor and judging discharge status based on change of output from the sensor is known. In an apparatus using this photo-interruptive type sensor, to avoid leakage of ink droplets discharged to interrupt the light beam of the sensor within the apparatus, a member for receiving the ink droplets is provided.

However, there is a possibility that non-ink material such as sediment of solidified dyestuffs after evaporation of volatile ink component interrupts the optical axis of light of the photo-interruptive type sensor. In this case, it is judged that ink droplets are discharged although the ink droplets are not normally discharged, as a result, print results on which normal images are not formed are continuously outputted. Further, in a case where abnormality occurs in a printhead and the printhead cannot perform normal ink discharge, there is a possibility that it is judged that ink droplets are normally discharged, and the printhead is continuously driven without discharging ink, thus damaging the printhead.

SUMMARY OF THE INVENTION

Accordingly, the present invention has its object to provide a facsimile apparatus which easily judges erroneous residual-ink detection due to non-ink material, e.g., sediment of solidified ink, and notifies a user of the erroneous detection.

According to the present invention, the foregoing object is attained by providing a facsimile apparatus including a printhead for printing an image on a print medium by discharging ink supplied from an exchangeable ink cartridge, comprising: communication means for performing transmission and reception of facsimile data via a communication line; memory means for storing the facsimile data received by the communication means; instruction means for instructing residual-ink detection in the ink cartridge; detection means for performing the residual-ink detection in the ink cartridge, in accordance with an instruction by the instruction means, or upon storage of the facsimile data into the memory means; verification means for verifying the result of residual-ink detection by the detection means; and display means for displaying a message based on the result of residual-ink detection and the result of verification by the verification means.

In accordance with the present invention as described above, in a facsimile apparatus having the printhead which performs printing by discharging ink supplied from an exchangeable ink cartridge, on the print medium, a residual-ink amount in the ink cartridge is detected upon residual-ink detection instruction or storage of received facsimile data into the storage means. Then the result of detection is verified. Thereafter, a message is displayed based on the detection result and the verification result.

The detection of residual-ink in the ink cartridge is made by employing light-emission means for emitting light and photoreception means for receiving the light emitted by the light-emission means, both means being provided opposite to each other, with ink-discharge orifices of the printhead existing between them, and comparison means for comparing a light-interruption period, in which the light is interrupted between the light-emission means and the photoreceptor means, with a first threshold value. If the light-interruption period is shorter than the first threshold value, it is judged that ink is exhausted.

The verification of the result of residual-ink detection is made by determining whether or not the result of residual-ink detection in the ink cartridge is appropriate, based on whether or not light transmission between the light-emission means and the photoreceptor means is interrupted when the printhead does not perform ink-discharge operation. Further, it may be designed such that the light-interruption period is compared with a second threshold value greater than the first threshold value, and if the light-interruption period is longer than the second threshold value, the verification of the result of residual-ink detection is performed.

The message includes a first message indicating that ink is exhausted and a second message indicating abnormality of residual-ink detection. Whether or not the second message should be displayed is selectively set.

Note that the printhead is an ink-jet printhead which performs printing by discharging ink or it may be a printhead which utilizes thermal energy to discharge ink, comprising electrothermal transducers for generating thermal energy to be supplied to ink.

The present invention is particularly advantageous since the facsimile apparatus judges erroneous residual-ink detection due to non-ink material such as sediment of solidified ink, and notifies the user of the erroneous detection.

Further, the above judgment, which is made based on the result of verification of the detection result, can be simply made without complexity of the apparatus construction.

Further, according to another aspect of the present invention, a message indicating erroneous residual-ink detection can be selectively displayed.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
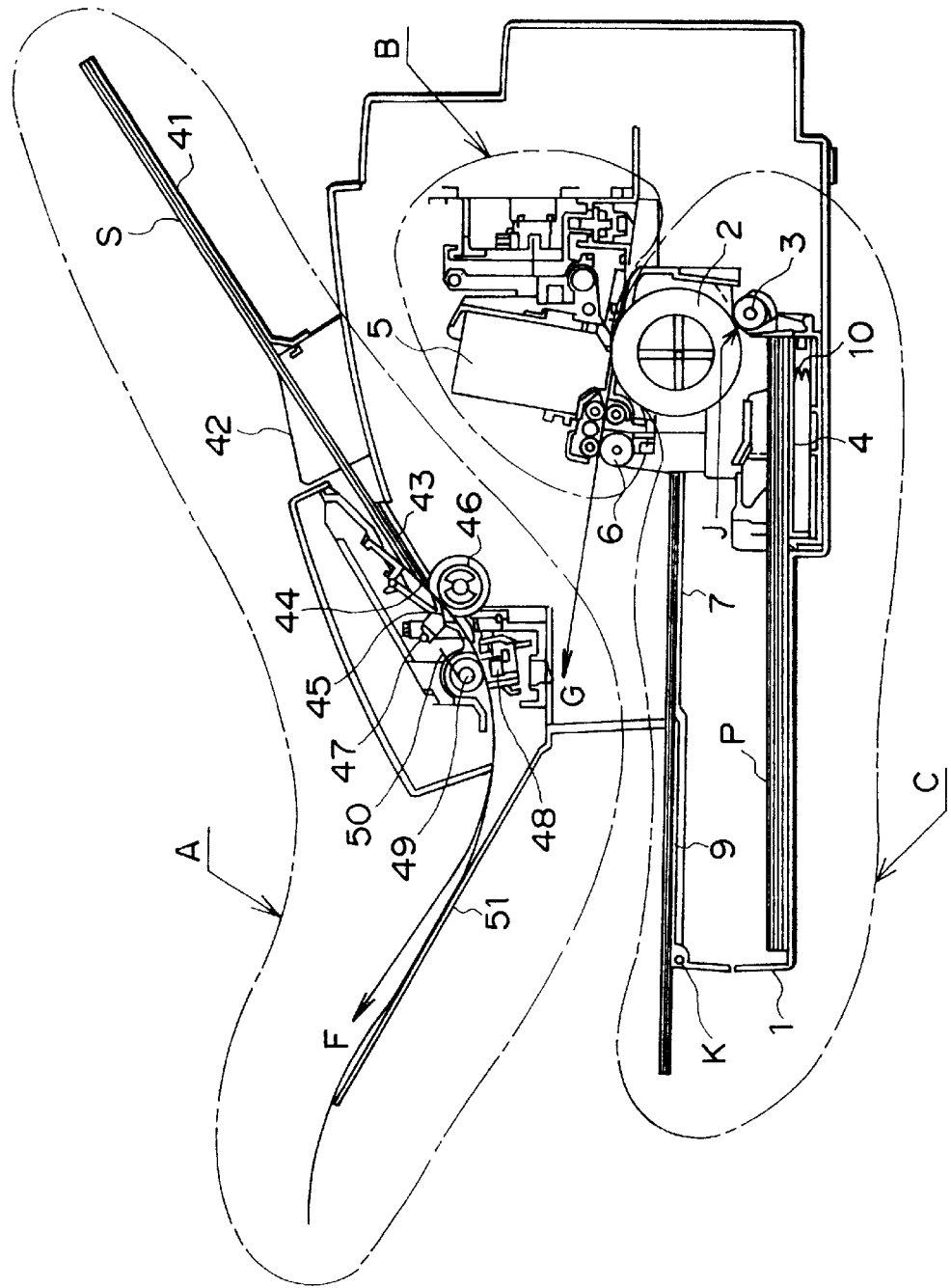
FIG. 1 is a cross-sectional view showing a structure of a facsimile apparatus comprising a printer, which performs printing by a printhead in accordance with an ink-jet printing method, according to a representative embodiment of the present invention.

FIG. 1 is a cross-sectional view showing a structure of a facsimile apparatus comprising a printer, which performs printing by a printhead in accordance with an ink-jet printing method, according to a representative embodiment of the present invention.

Hereinbelow, the general structure of the facsimile apparatus will be described with reference to FIG. 1. In FIG. 1, reference A denotes a reader which optically reads an original; B, a printer which performs printing in accordance with an ink-jet printing method; and C, a paper feeder which supplies print medium such as a print sheet P, set in a paper cassette, one sheet at a time, to the printer B.

First, the flow of operation in the print sheet P will be described. A conveyance path of the print-sheet P is as shown by an arrow G. That is, the print sheet P set in the paper cassette 1 of the paper feeder C is picked up by a paper-feed roller 2 and a retard roller 3, and supplied to the printer B by the paper-feed roller 2. The printer B performs printing by discharging ink from a printhead 5 on the print sheet P, while conveys the print sheet P in synchronization with the printing. When the printing is completed, the print sheet P is discharged by a discharge roller 6 onto a discharger stacker 7.

Next, the specific construction of the paper feeder C will be described.

In FIG. 1, the paper cassette 1 for containing a plural number of print sheets P has a middle plate 4 on which the print sheets P are placed. The middle plate 4 is biased upward from its back by a middle-plate spring 10 provided opposite to the paper-feed roller 2. In paper-feed stand-by status, the middle plate 4 has a structure which is pressed downward by a cam or the like and when the number of print sheet P has decreased or there is no print sheet P, additional print sheets can be easily set.

On the other hand, when a print signal is detected and paper-feed operation is started, the middle plate 4 pressed downward by the cam and the like is released, and the print sheet P is picked up by the paper-feed roller 2. The retard roller 3 is positioned opposite to the paper-feed roller 2, and is cooperated with the middle plate 4 to change the position of the print sheet P. Upon paper-feed operation, only the uppermost print sheet P, biased by the middle plate 4 and picked up by the paper-feed roller 2, is separately conveyed by cooperation at a unit J with the paper-feed roller 2. The separated print sheet P is supplied, while being held so as to sufficiently wind around the paper-feed roller 2, to the printer B.

Next, a discharge mechanism for the paper sheet P printed by the printer B will be described.

The print sheet P discharged by the discharge roller 6 is discharged onto the discharge stacker 7. The discharge stacker 7 has an auxiliary discharge tray 9 which rotates on a hinge K. In a case where the print sheet P is used from the shorter side as the top, the auxiliary discharge tray 9 is rotated so as to extend the stacker area of the discharge stacker 7 in the paper-discharge direction. The discharge stacker 7 also serves as a cover of the paper cassette 1. Note that the discharge stacker 7 and the auxiliary discharge tray 9 respectively have a plurality of ribs (not shown). The printed print sheet P is slided on the plurality of ribs, and sequentially accumulated.

Further, the flow of conveyance of an original S will be described.

A conveyance path for the originals is as shown by an arrow F in FIG. 1. In FIG. 1, the original S is placed, with the image-side surface being faced down, on an original tray 41. The original S placed on the original tray 41 is positioned by a slider 42 which is movable in an original-widthwise direction. As the original S is placed on the original tray 41, the original S is pressed by a pre-conveyance pressing piece 43 from an upper position via a pre-conveyance spring 44, and the original S is preliminary conveyed in cooperation with a separation roller 46.

Then, preliminary-conveyed originals S are separately conveyed from the bottom sheet in cooperation with a separation piece 45 and the separation roller 46, pressed downward by an ADF spring 47, one by one. Further, the separation roller 46 conveys the separated original S to a reading position. Thus, the image on the original S separately-conveyed by the separation roller 46 to the reading position is read by a reading sensor (photoelectric transducer) 48. A CS roller 49 is biased downward by a CS pressing spring 50 along a reading line of the reading sensor 48, to press the separately-conveyed original S against the reading line. Further, the CS roller 49 determines a reading speed for reading the original S in a sub-scanning direction (original-conveyance direction), and discharges the read original S. Finally, the discharged original S is stacked on the discharge tray 51. Note that the discharge tray 51 is detachable from the apparatus main body.

Figure 2:
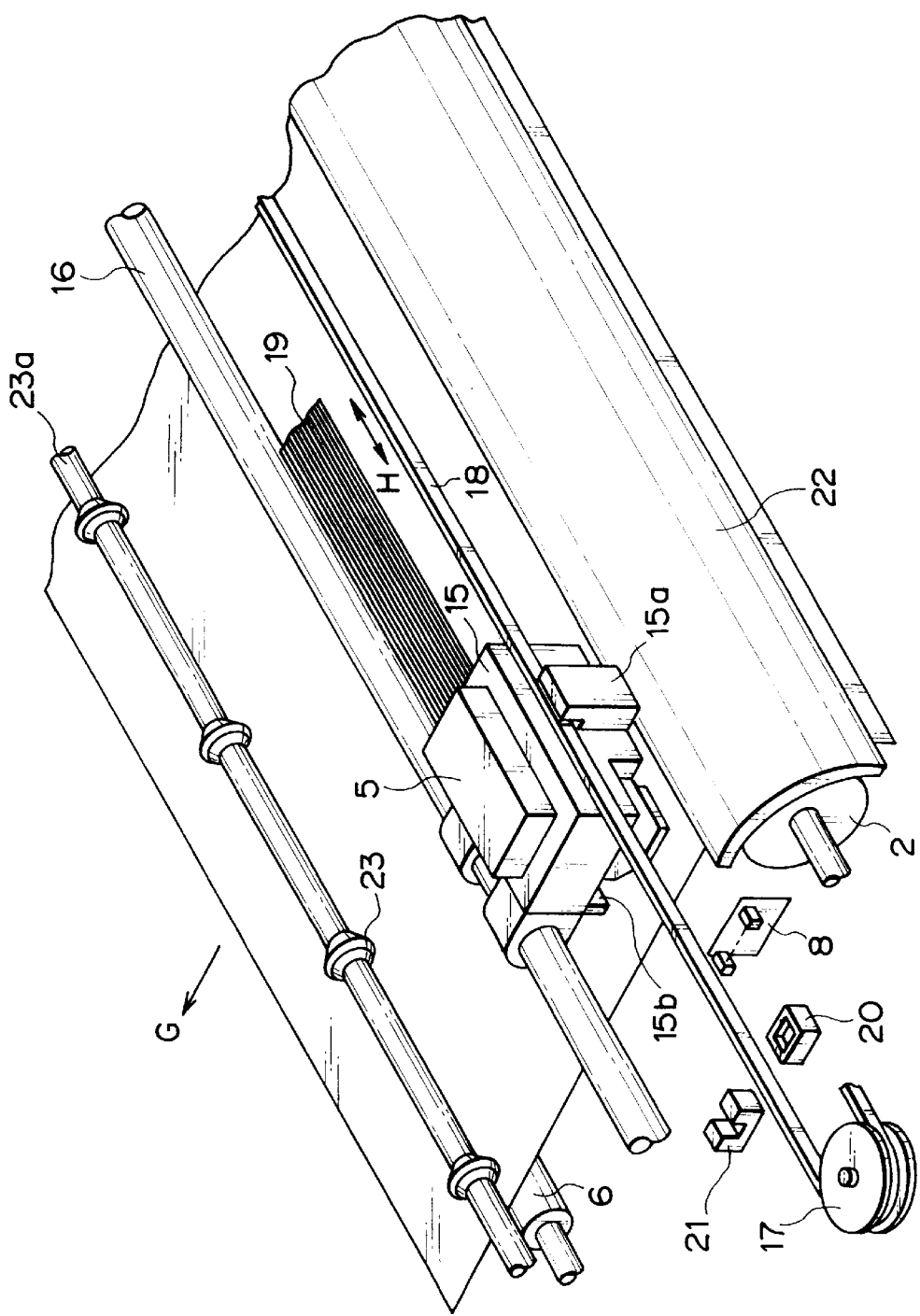
FIG. 2 is a perspective view showing a detailed structure of a printer B of the facsimile apparatus in FIG. 1.

FIG. 2 is a perspective view showing the detailed structure of the printer B. As shown in FIG. 2, the printhead 5 is a cartridge type printhead which integrates an ink tank and which can be exchanged for a new printhead when ink is exhausted.

Next, the principle of an ink-discharge from the printhead will be described. Generally, the printhead comprises fine liquid discharge orifices, fluid channels and energy acting portions each provided at a part of each fluid channel, and energy-generating portions which generate liquid-droplet formation energy to be acted on liquid at the energy-generating portions.

The energy-generating portion may employ a electromechanical transducer such as a piezoelectric device; otherwise, the energy-generating portion may irradiates an electromagnetic wave such as a laser beam upon a liquid so that electromagnetic energy is absorbed in the liquid, the liquid in heated up, and the liquid droplets are discharged by action due to generated heat; otherwise, the energy-generating portion may employ an electrothermal transducer to heat a liquid and discharge the liquid. Above all, a printhead using an ink-discharge method utilizing thermal energy can perform high-resolution printing, since the liquid-discharge orifices for discharging liquid droplets for printing can be arranged in high density.

A printhead using the electrothermal transducers as the energy-generating portions can be easily minimized. This printhead can fully utilize advantages of IC-manufacturing techniques and microprocess techniques, which have been greatly improved and are highly reliable in recent semiconductor-manufacturing. Further, the number of print nozzles in this printhead can be increased in one direction so as to extend the printing width or print nozzles in this printhead can be assembled to form two-dimensional (two rows) nozzle array. For these reasons, this printhead is suitable for multi-nozzle manufacturing and high-density assembling. Further, this printhead can be directed to mass production with low production costs.

Thus, the printhead, using electrothermal transducers as the energy-generating portions, manufactured via semiconductor-manufacturing processes, generally has ink channels corresponding to respective ink-discharge orifices and electrothermal transducers as means for forming discharge ink droplets. The electrothermal transducers impart thermal energy to ink filling the ink channels, and discharge the ink from corresponding ink-discharge orifices. The ink channels are connected to a common liquid chamber, and they are supplied with the ink from the common liquid chamber.

The construction of the printer B will be described with reference to FIG. 2.

In FIG. 2, a carriage 15 scans the printhead 5 in a direction (main-scanning direction; represented by an arrow H) orthogonal to the print-sheet P conveyance direction (subscanning direction; represented by arrow G direction in FIG. 1), while holding the printhead 5 with high precision. The carriage 15 is slidably held by a guide shaft 16 and a thrust member 15a. The scanning movement of the carriage 15 is performed by a pulley 17 driven by a carriage motor 30 (not shown in FIG. 2) and a timing belt 18. At this time, a print signal and electric power are supplied via a flexible cable 19 to the printhead 5 from an electric circuit of the apparatus main body. The printhead 5 and the flexible cable 19 are connected by press-connecting respective contact points with each other.

A cap 20 which functions as an ink receptor is provided at the home position of the carriage 15 of the printer B. The cap 20 moves up/down in accordance with necessity. When the cap 20 moves up, it comes into tight contact with the printhead 5 to cover the nozzle portion of the printhead 5, thus preventing evaporation of ink and attachment of extraneous matter (dust) to the nozzles.

In this apparatus, to arrange the printhead 5 and the cap 20 to positions relatively opposite to each other, a carriage home-position sensor 21 provided in the apparatus main body and a light-shield plate 15b provided at the carriage 15 are employed.

The carriage home-position sensor 21 uses a photo-interrupter. When the carriage 15 moves to a standby position, light irradiated from a part of the carriage home-position sensor 21 is interrupted by the light-shield plate 15b; at this time, it is detected that the printhead 5 and the cap 20 are at relatively opposite positions.

In FIG. 2, the print sheet P is fed from the lower side to the upper side in this drawing paper, and bent in a horizontal direction by the paper-feed roller 2 and the paper guide 22, then conveyed in the arrow G direction (subscanning direction). The paper-feed roller 2 and the discharge roller 6 are respectively driven by a drive motor (not shown); they operate, cooperated with scanning of the carriage 15, to convey the print sheet P in the subscanning direction with high precision. Further, rollers 23 comprising of water repellent material and having blade-like circumferential portions to contact the print sheet P are provided for paper feeding in the subscanning direction. The rollers 23 are arranged on a roller shaft 23a opposite to the discharge roller 6, at a predetermined intervals. Even when the rollers 23 come into contact with unfixed image on the print sheet P immediately after printing, the rollers 23 guide and convey the print sheet P without influencing the image.

Figure 3:
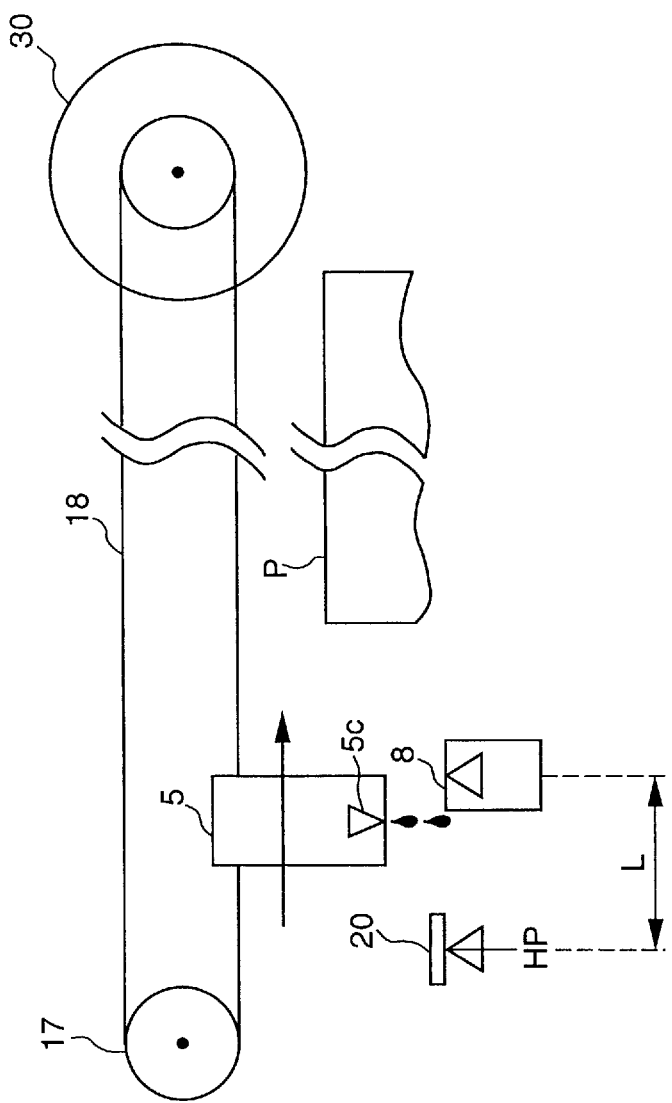
FIG. 3 is a schematic view showing a construction around a photosensor 8 of the printer B.

FIG. 3 is a schematic view showing a construction around a photosensor 8 of the printer B. As shown in FIG. 3, the photosensor 8 is provided between the cap 20 and the side end of the print sheet P, at a position opposite to a nozzle array 5c of the printhead 5. The photosensor 8 optically detects ink droplets discharged by the nozzles of the printhead 5. When there is no ink in the printhead 5, the ink-exhausted status can be judged from output from the photosensor 8.

In the present embodiment, the photosensor 8 employs an infrared LED as a light-emission device, and a lens is integrally molded on the light-emission surface of the LED, so as to irradiate light in approximately parallel toward a photoreception device. The photoreception device is a photo-transistor having a 0.7×0.7 mm hole formed of a mold member, on the optical axis, on its photoreception surface. That is, a detection range is narrowed to 0.7 mm in height and 0.7 mm in width between the photoreception device and the light-emission device. The optical axis connecting the light-emission device and the photoreception device is set to parallel to the nozzle array 5c of the printhead 5. The interval between the light-emission device and the photoreception device is greater than the length of the nozzle array 5c of the printhead 5. When the optical axis and the position of the nozzle array 5c coincide, all ink droplets discharged from the nozzles of the printhead 5 pass the detection range between the light-emission device and the photoreception device. As the ink droplets pass the detection range, the ink droplets interrupt light from the light-emission side, and decrease light intensity to the photoreception side, thus the output from the photo-transistor as the photoreception device changes.

Similar to positioning of the printhead 5 and the cap 20, the carriage home-position sensor 21 provided in the apparatus main body is used to arrange the nozzle array 5c of the printhead 5 and the photosensor 8 at relatively opposite positions.

As shown in FIG. 3, this embodiment converts a distance (L), between the home position (HP) of the printhead 5 and a position on the optical axis of the photosensor 8, into a number of steps of at a stepping motor for driving the carriage 15, and sets in advance this number of steps of the motor as a constant in a control program to execute print operation. Thus, by moving the carriage 15 by a predetermined amount after detection of the home position, the nozzle array 5c of the printhead 5 and the optical axis of the photosensor 8 are precisely set at relatively opposite positions.

Figure 4:
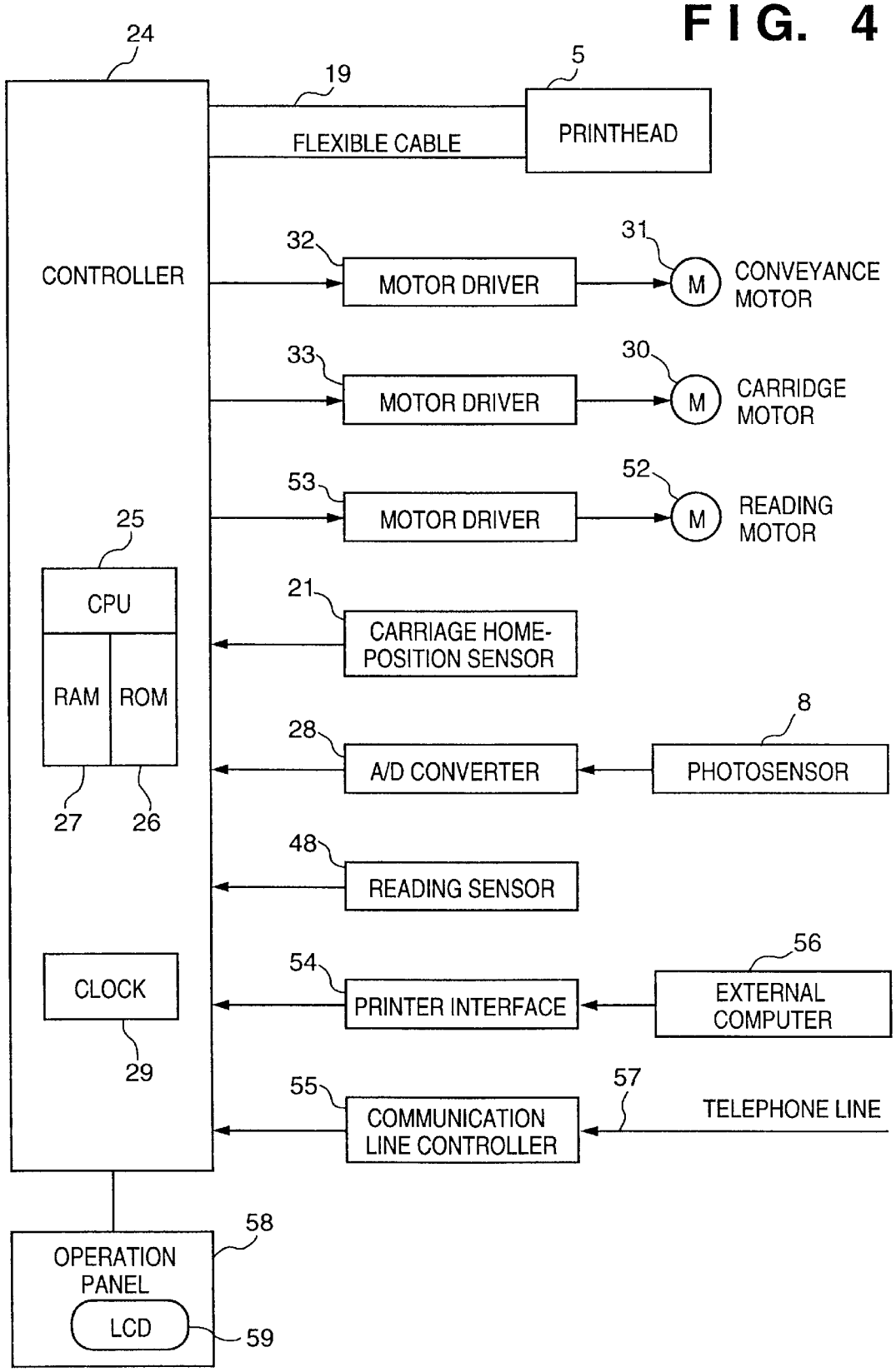
FIG. 4 is a block diagram showing a control construction of the facsimile apparatus in FIG. 1.

FIG. 4 is a block diagram showing a control construction of the facsimile apparatus in FIG. 1.

In FIG. 4, numeral 24 denotes a controller for controlling the overall apparatus. The controller 24 comprises a CPU 25, a ROM 26 in which control programs to be executed by the CPU 25 and various data are stored, a RAM 27 used as a work area for execution of various processing by the CPU 25 and used for temporarily storing various data, and the like.

As shown in FIG. 4, the printhead 5 is connected to the controller 24 via the flexible cable 19. The flexible cable 19 includes a control-signal line from the controller 24 to the printhead 5 and an image signal line. The output from the photosensor 8 is digitized by an A/D converter 28 so that it can be analyzed by the CPU 25. The carriage motor 30 is rotatable based on a pulse-step number from a motor driver 32. Further, the controller 24 controls the carriage motor 30 via a motor driver 33, a conveyance motor 31 via a motor driver 32, and a reading motor 52 via a motor driver 53. Also, it inputs output from the carriage home-position sensor 21.

The controller 24 is connected to image-data input devices such as the reading sensor 48, a printer interface 54 for receiving print instruction from an external computer 56 and print data, and a communication line controller 55 for receiving reception data from a telephone line 57. Thus, the controller 24 can be used with a printer for facsimile transmission/reception, copier, and a printer of the external computer. Further, the controller 24 is connected to an operation panel 58 for a user of the apparatus to perform various operations and instructions. In the following residual-ink detection and notification processing, the user can instruct whether or not a message (abnormality notification message), indicating that residual-ink detection is not normally performed should be displayed, from the operation panel 58. The operation panel 58 has an LCD 59 for displaying messages.

Figure 5:
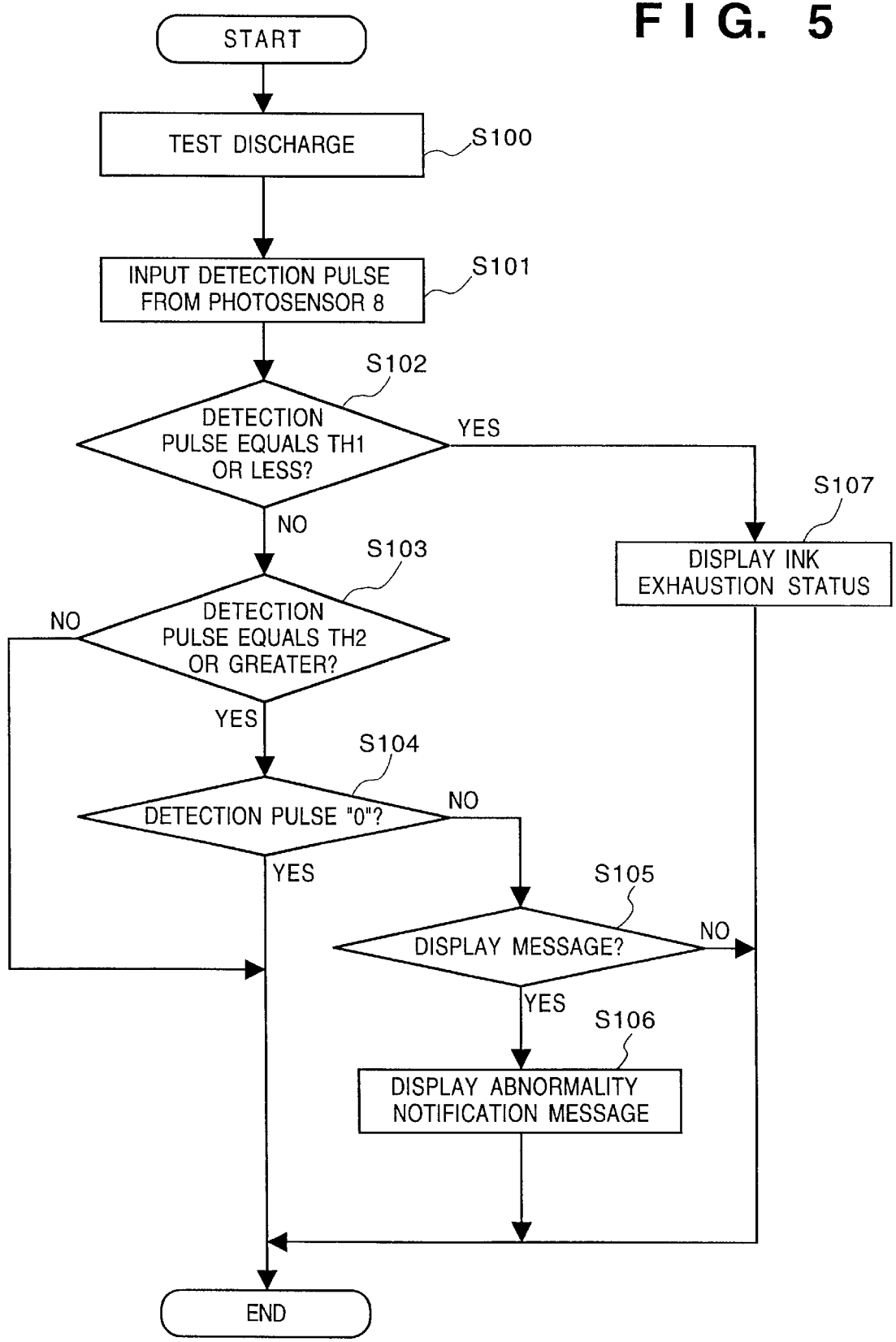
FIG. 5 is a flowchart showing residual-ink detection and notification processing.

Next, residual-ink detection and notification processing using the apparatus having the above construction will be described with reference to the flowchart of FIG. 5.

At step S100, the controller 24 moves the printhead 5 to the position opposite to the photosensor 8, to perform ink discharge (test discharge) between the light-emission device of the photosensor 8 and the photoreception device, in accordance with key-input from the operation panel 58 or at pre-set timing (e.g., when image data is stored in an image memory after facsimile reception or the like). Next, at step S101, output change from the photo-transistor, used as the photoreception device is detected, and a detection pulse is transmitted to the CPU 25 of the controller 24.

While light from the light-emission device is interrupted, a detection pulse at a level "H" is outputted. On the other hand, when the ink is not discharged, the output from the photo-transistor does not change, and the detection pulse remains at a level "L".

At step S102, the controller 24 that received the detection pulse examines a period in which the output pulse is at the "H" level (detection pulse width: PL) is equal to a first threshold value (TH1) or less. If PL $\leq$ TH1 holds, the controller 24 judges that the period in which ink discharge is detected is short and the amount of ink is small. The processing proceeds to step S107, at which a message "NO INK" is displayed on the LCD 59. Thereafter, the processing ends. On the other hand, if PL > TH1 holds, the processing proceeds to step S103.

At step S103, it is examined whether or not the detection pulse width is equal to a second threshold value (TH2) or greater. If PL $\geq$ TH2 holds, as the period of interruption of light from the light-emission device is too long, it is considered that the light interruption has not been made by discharged ink. The processing proceeds to step S104, at which the detection pulse from the photo-transistor is examined without ink discharge.

Since ink discharge is not performed, so far as the photosensor 8 operates normally, the output from the photo-transistor must be at the "L" level. Accordingly, at step S104, if the detection pulse width is "0" (i.e., the output from the photo-transistor is at the "L" level), the processing ends. On the other hand, if the detection pulse width is not "0", it is judged that abnormality occurs at the operation of the photosensor 8 or solidified ink substance has accumulated between the light-emission device and the photoreception device to interrupt light from the light-emission device, preventing normal residual-ink detection. Then the processing proceeds to step S105, at which it is examined whether or not the apparatus is set to display an abnormality notification message. If YES, the processing proceeds to step S106, at which a message notifying that normal residual-ink detection is impossible is displayed on the LCD 59, thereafter, the processing ends. On the other hand, if the apparatus is not set to display the abnormality notification message (NO at step S105), the processing ends.

When the abnormality notification message is displayed, the user performs cleaning of the photosensor 8 to remove sediment between the light-emission device and the photoreception device, otherwise, calls a maintenance engineer to change parts such as the photosensor 8 and the ink receptor or change the parts by himself/herself.

According to the present embodiment, in accordance with an instruction from the operation panel 58 or when facsimile image data is received and stored into the image memory, the printhead 5 is moved to a position opposite to the photosensor 8, to perform test discharge. It is determined whether or not ink remains, based on the detection pulse-width obtained from residual-ink detection upon the test discharge. Further, if the result of the residual-ink detection is not reliable, the output from the photosensor 8 is examined again to determine whether or not residual-ink detection is precisely performed.

If it is judged from this re-examination of the photosensor output that residual-ink detection is not precisely performed, the abnormality notification message can be displayed on the LCD 59, in accordance with the setting of the apparatus. Further, since the re-examination is to simply examine the output from the photosensor 8 again, this re-examination can be easily performed without complexity of the apparatus construction.

In the present embodiment, the structure of the photosensor 8 is not described, however, it is arranged such that the user of the apparatus can easily perform cleaning or change parts. For example, an opening of a cover (not shown) of the apparatus provides access to the position where the photosensor 8 is set, otherwise, it is designed to provide no component between the opening of the cover and the photosensor 8, so that cleaning between the light-emission device and the photoreception device can be easily made from the opening.

Further, in this embodiment, the printhead is a cartridge type printhead which integrates an ink tank so that the printhead can be changed when the ink is exhausted, however, the present invention is not limited to this type of printhead. For example, as another cartridge type printhead, a printhead in which only the ink tank can be removed for new one when ink is exhausted can be employed.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 300° C. to 700° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus including a printhead for printing an image on a print medium by discharging ink supplied from an exchangeable ink cartridge, comprising:

communication means for performing transmission and reception of facsimile data via a communication line;

a memory for storing the facsimile data received by said communication means;

instruction means for instructing residual-ink detection in said ink cartridge;

a detection unit for performing the residual-ink detection in said ink cartridge, in accordance with an instruction by said instruction means, or upon storage of the facsimile data into said memory;

verification means for verifying the result of residual-ink detection by said detection unit; and a display for displaying a message based on the result of residual-ink detection and the result of verification by said verification means.

2. The apparatus according to claim 1, wherein said detection unit includes:

a light-emission device for emitting light to a position where ink discharged from an ink-discharge orifice of said printhead passes;

a photoreception device for receiving the light; and measurement means for measuring period in which the light is interrupted between said light-emission device and said photoreception device.

3. The apparatus according to claim 2, wherein said detection unit further includes comparison means for comparing the period measured by said measurement means with a first threshold value.

4. The apparatus according to claim 3, wherein if it is judged from the result of comparison by said comparison means that the period is equal to the first threshold value or shorter, it is judged that ink is exhausted.

5. The apparatus according to claim 3, wherein when ink discharge operation by said printhead is not performed, said verification means verifies whether or not the result of residual-ink detection by said detection unit is appropriate, based on whether or not the light is interrupted between said light-emission device and said photoreception device.

6. The apparatus according to claim 5, wherein said verification means compares the period with the second threshold value greater than the first threshold value, and if the period is equal to the second threshold value or longer, verifies whether or not the result of residual-ink detection by said detection unit is appropriate.

7. The apparatus according to claim 2, further comprising a carriage scanning said printhead.

8. The apparatus according to claim 7, wherein said light-emission device and said photoreception device are provided near a home position of said printhead.

9. The apparatus according to claim 8, wherein said carriage includes a part of a home-position detector detecting that said printhead is at the home position.

10. The apparatus according to claim 9, wherein after said home-position detector detects that said printhead is at the home position, said carriage moves said printhead to a position where said light-emission device and said photoreception device are situated and performs the residual-ink detection.

11. The apparatus according to claim 1, wherein the message displayed by said display includes a first message notifying that ink is exhausted in said ink cartridge and a second message notifying detection abnormality of said detection unit.

12. The apparatus according to claim 11, further comprising setting means for setting whether or not to display the second message.

13. The apparatus according to claim 1, wherein said printhead is an ink-jet printhead which performs printing by discharging ink.

14. The apparatus according to claim 1, wherein said printhead is a printhead which discharges ink by utilizing thermal energy, and comprises electrothermal transducers for generating thermal energy to be supplied to ink.

15. The apparatus according to claim 1, wherein said display includes an LCD.

16. An inkjet printing apparatus for printing an image on a print medium by using an inkjet printhead for discharging ink, comprising:

a detection unit including a light-emission device emitting light and a photoreception device receiving the light;

measurement means for measuring period in which the light is interrupted between said light-emission device and said photoreception device;

determination means for determining an ink-discharge state of the inkjet printhead in accordance with a state of the light interruption when the inkjet printhead discharges ink between said light-emission device and said photoreception device; and verification means for determining hat the result of detection by said detection unit is not valid if the period measured by aid measurement means is greater than or equal to a predetermined value.

17. The apparatus according to claim 16, wherein said determination means determines that ink is not normally discharged by the inkjet printhead if the period measured by said measurement means is smaller than a first threshold value.

18. The apparatus according to claim 17, wherein said determination means determines that ink is normally discharged by the inkjet printhead if the period measured by said measurement means is greater than or equal to the first threshold value, and is smaller than a second threshold value.

19. The apparatus according to claim 18, wherein the second threshold value is not greater than the predetermined value.

20. The apparatus according to claim 16, further comprising scanning means for scanning the inkjet printhead.

21. The apparatus according to claim 20, wherein said light-emission device and said photoreception device are provided near a home position of the inkjet printhead.

22. The apparatus according to claim 21, wherein said scanning means includes a home-position detector detecting that the inkjet printhead is at the home position.

23. The apparatus according to claim 22, wherein after the home-position detector detects that the inkjet printhead is at the home position, the inkjet printhead is moved to a position where said light-emission device and said photo-reception device are situated and performs residual-ink detection.

24. The apparatus according to claim 16, further comprising a display unit displaying the determination result by said determination means and the determination result by said verification means.

25. The apparatus according to claim 24, wherein said display unit is capable of displaying a first message indicating that ink is not discharged and a second message indicating that the detection by said detection unit is not normal.

26. The apparatus according to claim 24, wherein said display unit includes an LCD.

27. The apparatus according to claim 16, wherein said determination means determines existence/non-existence of ink in accordance with state of the light interruption.

28. The apparatus according to claim 16, wherein the inkjet printhead is a printhead which discharges ink by utilizing thermal energy, and comprises electrothermal transducers for generating thermal energy to be supplied to ink.

29. A method of determining an ink-discharge state of an inkjet printhead in an inkjet printing apparatus, which includes the inkjet printhead for discharging ink and a detection unit including a light-emission device emitting light and a photoreception device receiving the light, for printing an image on a print medium by using the inkjet printhead, comprising the steps of:

discharging ink from the inkjet printhead between said light-emission device and said photoreception device;

measuring period in which the light is interrupted between said light-emission device and said photoreception device;

determining the ink-discharge state of the inkjet printhead in accordance with a state of the light interruption when the inkjet printhead discharges ink between said light-emission device and said photoreception device; and judging that the result of detection by said detection unit is not valid if the period measured at said measuring step is greater than or equal to a predetermined value.

30. The method according to claim 29, wherein said determining step determines that ink is not normally discharged by the inkjet printhead if the period measured at said measuring step is smaller than a first threshold value.

31. The method according to claim 29, wherein said determining step determines that ink is normally discharged by the inkjet printhead if the period measured at said measuring step is greater than or equal to the first threshold value, and is smaller than a second threshold value.

32. The method according to claim 31, wherein the second threshold value is not greater than the predetermined value.

33. The method according to claim 29, further comprising the step of displaying the determination result at said judging step and the determination result at said determining step.

34. The method according to claim 33, wherein a first message indicting that ink is not discharged and a second message indicating that the detection by said detection unit is not normal are displayed at said displaying step.

35. The method according to claim 29, wherein said determining step determines existence/non-existence of ink in accordance with the state of the light interruption.

36. The method according to claim 29, wherein the inkjet printhead is a printhead which discharges ink by utilizing thermal energy, and comprises electrothermal transducers for generating thermal energy to be supplied to ink.

* * * * *

UNITED STATES PATENT AND TRADEMARK OFFICE
CERTIFICATE OF CORRECTION

PATENT NO. : 5,822,076

DATED : October 13, 1998

INVENTOR(S) : Kenichi Maruyama

It is certified that error appears in the above-identified patent and that said Letters Patent is hereby corrected as shown below:

IN THE DRAWINGS:

Sheet 4, Figure 4, "CARRIDGE" should read --CARRIAGE--.

COLUMN 1:
Line 33, change "discharge/undischarge" to --discharge/non-discharge--;
Line 57, change "such" to --such a--; and
Line 65, change "enables" to --makes it possible--.

COLUMN 4:
Line 13 change "conveys" to --conveying--; and
Line 26, change the first occurrence of "sheet" to --sheets--.

COLUMN 5:
Line 32, change "irradiates" to --irradiate--; and
Line 35, change "in" to --is--.

COLUMN 6:
Line 41, change "cooperated" to --in cooperation--;
Line 48, delete "a"; and
Line 65, delete "in".

UNITED STATES PATENT AND TRADEMARK OFFICE
CERTIFICATE OF CORRECTION

PATENT NO. : 5,822,076

DATED : October 13, 1998

INVENTOR(S) : Kenichi Maruyama

It is certified that error appears in the above-identified patent and that said Letters Patent is hereby corrected as shown below:

COLUMN 7:

Line 5, delete "to"; and
    Line 26, delete "at".

COLUMN 8:
    Line 64 change "change" to --changes--.

COLUMN 9:
    Line 34, change "new" to --a new--.

COLUMN 10:
    Line 57, change "300°C to 700°C" to --30°C to 70°C--.

COLUMN 12:
    Line 56, change "hat" to --that--; and
    Line 58, change "aid" to --said--.

UNITED STATES PATENT AND TRADEMARK OFFICE
CERTIFICATE OF CORRECTION

PATENT NO. : 5,822,076

DATED : October 13, 1998

INVENTOR(S) : Kenichi Maruyama

Page 3 of 3

It is certified that error appears in the above-identified patent and that said Letters Patent is hereby corrected as shown below:

<u>COLUMN 14</u>:
Line 33, change "indicting" to --indicating--.

Signed and Sealed this

Thirteenth Day of July, 1999

Attest:

Q. TODD DICKINSON

*Attesting Officer*　　*Acting Commissioner of Patents and Trademarks*